Sept. 24, 1940. J. H. CHILDRESS 2,215,460

BARGE FOR SUBMARINE PIPE LAYING

Filed Aug. 31, 1939

James H. Childress INVENTOR.

BY

ATTORNEY.

Patented Sept. 24, 1940

2,215,460

UNITED STATES PATENT OFFICE 2,215,460

BARGE FOR SUBMARINE PIPE LAYING

James H. Childress, La Salina, Venezuela, assignor to Standard Oil Development Company, a corporation of Delaware Application August 31, 1939, Serial No. 292,755

4 Claims. (Cl. 61—72)

The present invention is directed to a barge for laying pipe under water. More particularly, it relates to a barge for use in the production of submarine oil wells so constructed as to permit the welding of pipe and the laying of the pipe immediately after its welding.

The principal object of the present invention is the provision of a barge provided with racks and conveyors so arranged that the handling, welding and laying of pipe is simplified.

An additional object of the present invention is the provision of a barge of the character described provided with means for preventing the occurrence of sharp bends in welded pipe due to the difference in level between the bottom and the deck of the barge.

Further objects and advantages of the present invention will appear from the following detailed description of the accompanying drawing in which—

Figure 1:
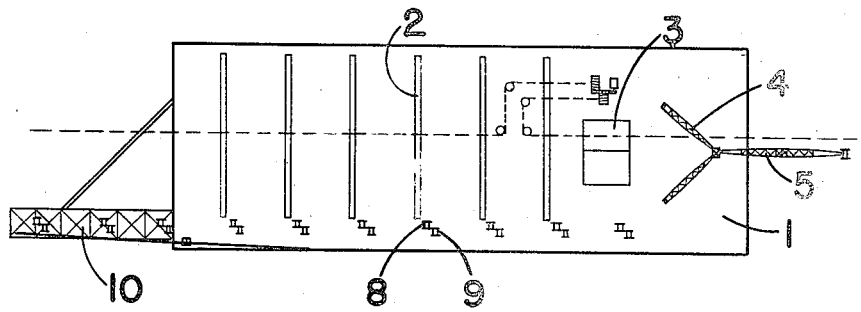
Figure 1 is a plan view of a barge according to the present invention.
Figure 2:
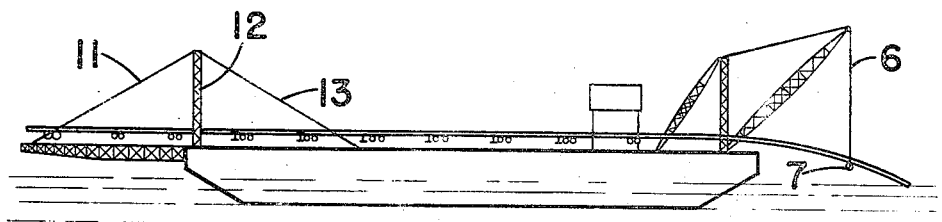
Figure 2 is a side elevation thereof.

Referring to the drawing in detail, numeral 1 designates a barge on the deck of which is provided a rack composed of spaced transversely arranged I-beams 2. In practice the length of the barge is such, and the number of I-beams is such, that three to four tandem lengths of prewelded pipe may be accommodated. Symmetrically arranged about the center line and toward the stern is the engine house 3 in which is contained a power generator for the welding equipment, the derrick machinery and the necessary water pumps. Also situated at the stern is the derrick 4 having a pivoted beam 5 over the end of which passes a cable 6 carrying a roller 7 at its lower end, this roller being mounted in a sling.

Arranged adjacent one side of the I-beam rack is a series of spaced rollers 8 in longitudinal alignment. Closely adjacent these rollers is another series of similarly spaced rollers 9, in longitudinal alignment. In alignment with both sets of rollers and extending forwardly of the barge is a bridge 10 also carrying rollers corresponding to 8 and 9. The end of this bridge is supported by a cable 11 secured to a mast pole 12 which, in turn, is supported by cable 13 fixed to the floor of the barge.

In practice, the pipe which is prewelded in lengths of three or four sections is stacked on the rack 2. Two of these lengths of pipe are arranged in abutting relation on the rollers 9 the one length extending forwardly onto the bridge 10. Another length is rolled on the rollers 8 so that it extends to the end of bridge 10. The two lengths of pipe on rollers 9 are then welded and moved rearwardly until the pipe rests on roller 7. The barge is then moved in the direction indicated by the arrow while the derrick beam 5 is manipulated so as to lower the pipe gradually into the water. When the welded pipe is moved sufficiently forward to enable the length of pipe on roller 8 to be moved forward to rollers 9, this is done and another length of pipe is moved onto rollers 8 and back onto bridge 10. The next weld is then performed and the barge is moved forward again and the previous operations are repeated.

It will be understood, of course, that once pipe on rollers 9 is connected to pipe already laid in position under water, relative motion of the pipe and the barge must be effected by moving the barge. In moving the barge the pipe line is set along the desired line of travel by the judicious use of anchors fore and aft. In cases where the water is relatively deep it is sometimes advisable to arrange a second barge or float behind the first one carrying a derrick similar to derrick 4 and provided with a roller similar to that of 7, but adapted to extend deeper so that pipe can be let down gradually to the bottom without the occurrence of any extreme bends.

The nature and objects of the present invention having been thus described and illustrated, what is claimed as new and useful and is desired to be secured by Letters Patent is:

1. A barge for the laying of pipe comprising a rack on the deck of the barge for the storage of lengths of pipe and a series of rollers adjacent one side of the rack for receiving lengths of the pipe to be joined together and to facilitate relative movement between the joined pipe and the barge.

2. A barge for the laying of pipe comprising a rack on the deck of the barge for the storage of lengths of pipe to be joined together, a series of rollers adjacent one side of the rack for receiving the lengths of pipe to be joined together, and means mounted on the rear of the barge and extending rearwardly thereof for supporting joined lengths of pipe at a distance from the rear end of said barge.

3. A barge for the laying of pipe comprising a rack on the deck of the barge adapted to receive lengths of pipe to be joined together and hold them in a horizontal position, a bridge extending forwardly of said barge, a series of rollers arranged adjacent one side of the rack and extending onto said bridge and adapted to receive lengths of pipe to be joined together, and a second series of rollers adjacent said first series and co-extensive therewith and adapted to receive pipe from said first series of rollers and advance said pipe toward the rear of the barge.

4. A barge according to the preceding claim provided with means mounted on its rear and extending rearwardly thereof for supporting joined lengths of pipe at a distance from the rear end of said barge.

JAMES H. CHILDRESS.